United States Patent Office

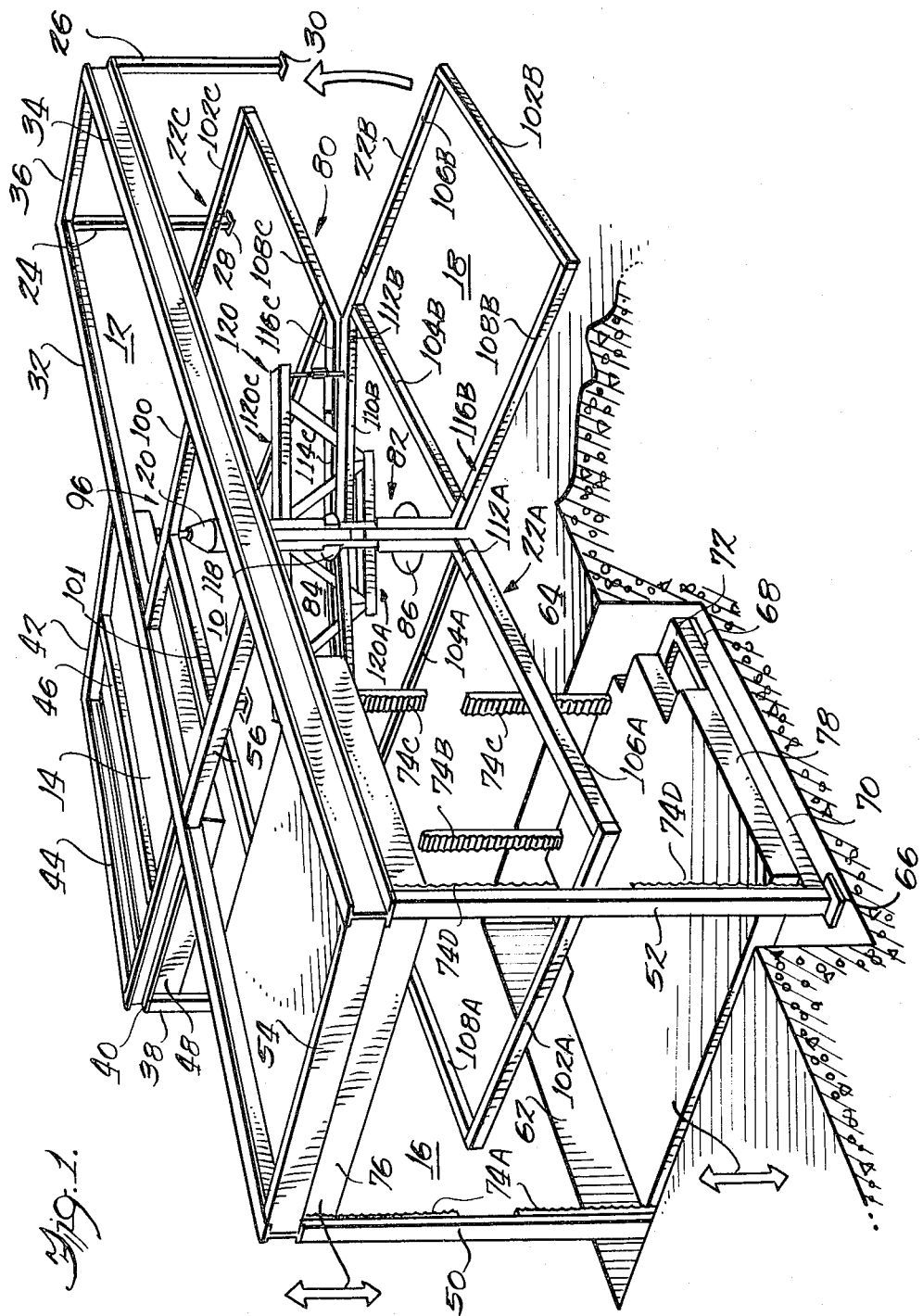

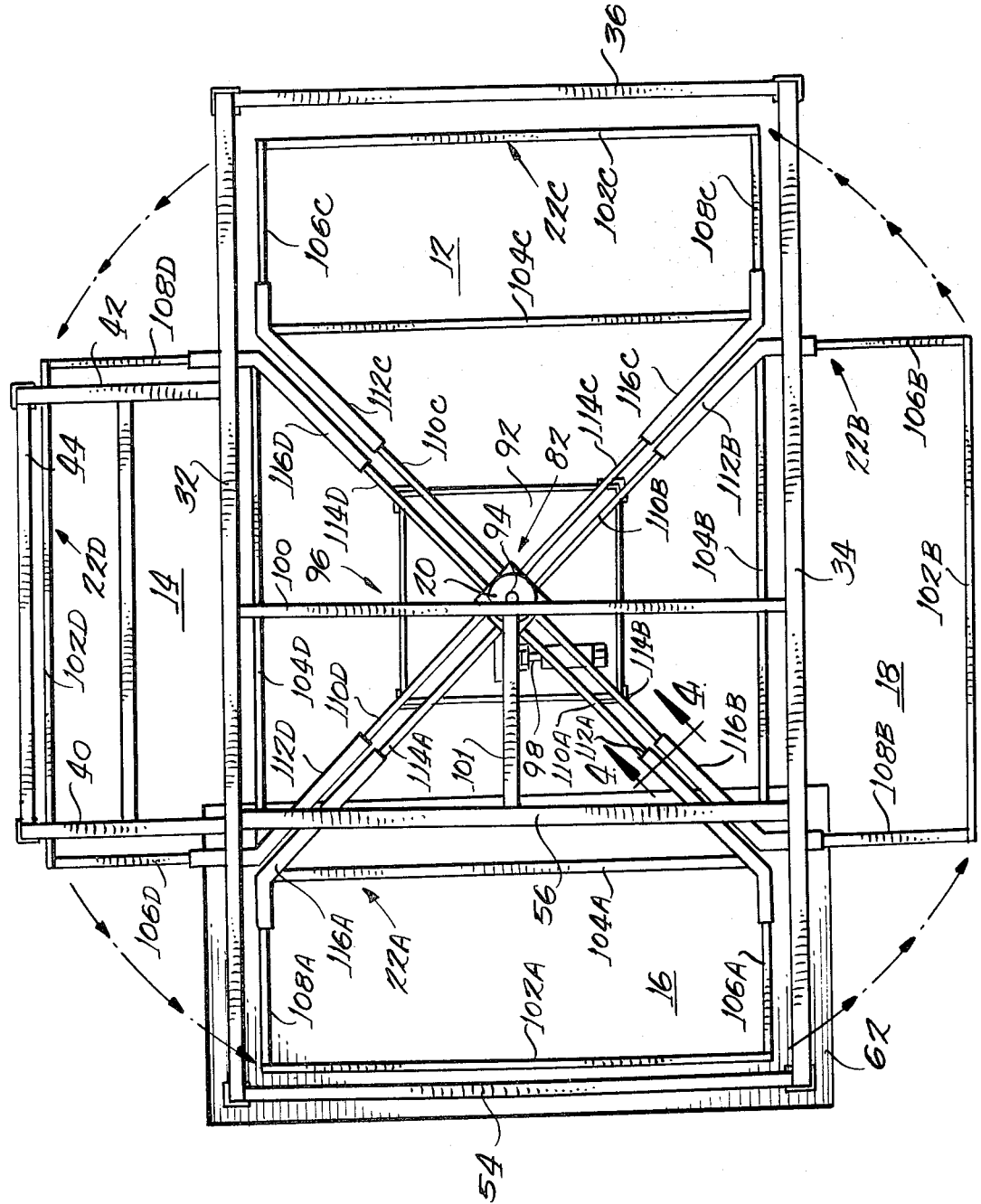

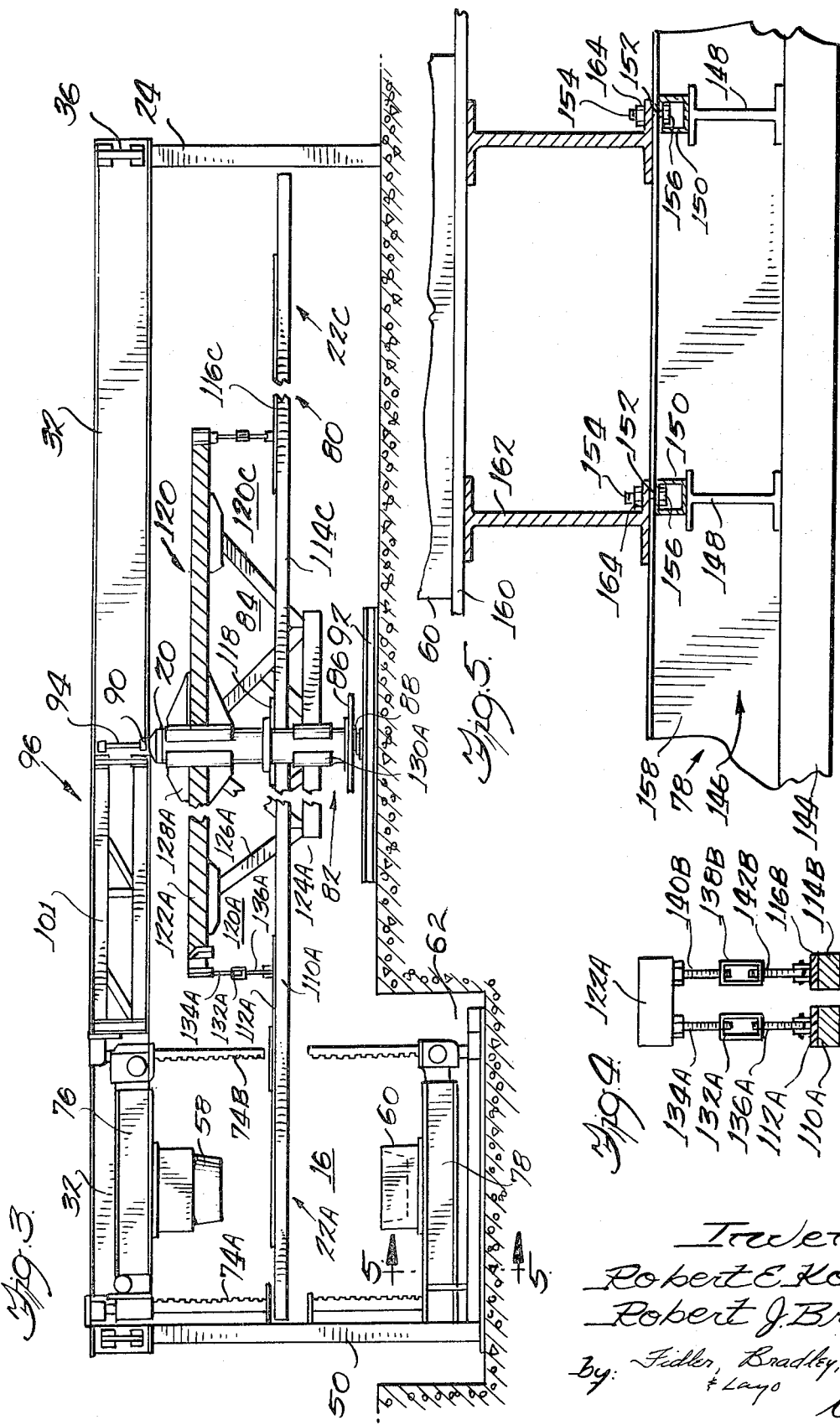

3,671,161
Patented June 20, 1972

3,671,161
MOLDING MACHINE
Robert E. Kostur, Oak Brook, and Robert J. Brown,
Chicago, Ill., assignors to Comet Industries, Inc.
Filed May 26, 1970, Ser. No. 40,568
Int Cl. B29c 1/00
U.S. Cl. 425—195                                    7 Claims

ABSTRACT OF THE DISCLOSURE

To reduce the vibrating of the molding machine during a molding operation, the frame of the molding machine includes two parallel I beams extending across the top of the machine from the outer end of the molding station to the outer end of the loading station with a rotary drive shaft and plastic sheet carrying assembly being centrally mounted with respect to the I beams for easy assembly and replacement. The rectangular sheet-holding frames of the rotary sheet carrying assembly are vertically supported at each end by turnbuckles connected to trusses by which the horizontal angle of the frames is adjusted. To permit easy assembly of the dies to movable platens within the molding station, the movable platens include longitudinally extending grooves adapted to receive T-bolts having outwardly extending shanks whereby the base for the dies is bolted to the platen.

---

This invention relates to molding machines and more particularly to the frame and die mounting structure for molding machines.

In some types of molding machines, called rotary molding machines, each machine includes a centrally located drive shaft coupled to sheet carrying frames to move the sheet carrying frames and sheets of plastic through radially disposed stations. One of these stations in an oven station which heats the plastic sheet within the sheet carrying frame and the next station is a molding station which shapes the heated plastic sheet. Two other stations are loading and unloading stations.

In one type of prior art rotary molding machine, the drive shaft assembly also serves as a central support post and each radially disposed station includes a plurality of uprights with horizontal beams connected to the uprights and to the central support post. The sheet carrying frames are supported on a drive plate that extends circumferentially around the drive shaft and support post to support the sheet carrying frames in cantilever fashion and drive them from station to station about the drive shaft. In the molding station, the platforms for the dies are bolted to movable platens.

The prior art molding machine has been very satisfactory but there are several difficulties that persons skilled in the art desire to alleviate. One of these difficulties is that the machine vibrates as the dies are moved together and under some circumstances cause a slight distortion in the molded product from the vibration of the male and female die with respect to each other. Another difficulty is that the sheet carrying frames cannot be easily leveled so that both sides are even and at the proper height. Still another difficulty is that it is not easy to assemble or to replace the drive mechanism because it is an integral part of a central support post. Still another difficulty is that it is not easy to accurately align the dies or to remove dies and replace them with other dies on the movable platens.

Accordingly, it is an object of this invention to provide a novel molding machine.

It is a further object of this invention to provide a novel frame and supporting structure for a molding machine.

It is a still further object of this invention to provide a molding machine with reduced vibration during the molding operation.

It is a still further object of this invention to provide a molding machine in which the plastic sheet carrying frames are easily leveled.

It is a still further object of this invention to provide a molding machine that is easily assembled.

It is a still further object of this invention to provide a molding machine in which the drive mechanism is easily assembled and replaced.

It is a still further object of this invention to provide a molding machine in which the dies are easily located in position, firmly held, and easily replaced.

In accordance with the above and further objects of the invention, a molding machine is provided having a centrally located rotary carriage, a loading station, an oven station, a molding station on the opposite side of said rotary carriage from the loading station and an unloading station on the opposite side of said rotary carriage from the oven station. To form the basic structural members of the machine, two parallel I beams extend across the top of the molding machine from the outer edge of the molding station to the outer edge of the loading station, being supported by uprights at the outer ends of the molding station and the loading station. The structural members forming the oven station and the unloading station are fastened to the I beams and to other structural elements.

Within the molding station, there are lower movable die platen and an upper movable die platen, each of which is adapted to have dies mounted to it for reciprocation towards and away from the other platen to form a molded article from a sheet of plastic. The base for the dies includes I beams having apertures in at least one flange and the movable platens each include longitudinally extending grooves opening into large elongated compartments within the platens.

To assemble the dies to the movable platens, T-bolts are loosely mounted to the flanges of the I beams on the base of the dies with the heads of the T-bolts extending outwardly from the base of the dies. The base of a die is then positioned adjacent to the surface of the platen to which it is to be attached with the heads of the T-bolts extending within the elongated channels and the shank of the T-bolts being confined by the grooves so that the T-bolts hold the I beams of the base of the dies in place. The die is then slid into position along the platen and the nuts for the bolts of the T-bolts tightened to firmly fasten the die at the proper location.

The rotary carriage includes a centrally located drive shaft rotated by a motor and coupled to a sheet-carrying assembly having four sheet-carrying frames and four trusses. To move the trusses and the sheet-carrying assemblies from station to station, the drive shaft is mounted to each of the trusses and to the inner end of each of the sheet-carrying assemblies. The trusses each include turnbuckles attached to the sides of sheet-carrying frames of the sheet-carrying assembly to provide vertical support to the sheet-carrying frames. These turnbuckles may be adjusted to level the frames so that they are perfectly horizontal.

This molding machine has several advantages, which are: (1) because of the large mass and strong support provided by the parallel I beams, the machine does not vibrate much when the platens are brought together to mold an article and therefore there is little distortion of the article from vibration; (2) the machine is easily assembled and the drive for the machine is easily replaced because the drive shaft is not integrally formed with a central support post; (3) the dies are easily mounted and replaced on the movable platens; and (4) the sheet-carrying frames are easily leveled by adjusting the turnbuckles.

The above noted and other features of the invention will be better understood from the following detailed description when considered with reference to the accompanying drawings, in which:

FIG. 1 is a fragmentary perspective view of a molding machine constructed in accordance with the principles of the invention;

FIG. 2 is a plan view of the embodiment of FIG. 1;

FIG. 3 is a fragmentary elevation view of the embodiment of FIG. 1;

FIG. 4 is a simplified elevational view of a portion of the molding of FIG. 1; and FIG. 5 is a sectional view taken along lines 5—5 of FIG. 3.

MAIN STRUCTURAL PARTS OF THE MOLDING MACHINE

In FIG. 1 a fragmentary perspective view of a molding machine in accordance with an embodiment of the invention is shown having a rotary carriage 10, a loading station 12, an oven station 14, a molding station 16, and an unloading station 18. The rotary carriage 10 includes a vertically extending rotatable shaft 20 and four horizontal, circumferentially-spaced sheet-carrying frames 22A–22D, with the frames 22A–22C being shown in FIGS. 1 and 2 while the frame 22D is shown only in FIG. 2. The vertically extending shaft 20 is centrally located with respect to the stations 12–18 and the horizontal sheet-carrying frames 22A–22D extend outwardly into the stations so that they may be rotated from station to station in a circular path in a plane between the floor and the roof of each station.

The loading station 12 includes the two tubular uprights 24 and 26, each being mounted to the floor by a different one of the corner plates 28 and 30 to form the outer vertical corners of the loading station 12. To form the top of the loading station, a first I beam 32 is supported at one end by the upright 24 to which it is bolted or welded and is supported at its other end by a similar upright in the molding station 16 to be hereinafter described. Similarly, an I beam 34 is mounted to the top of the tubular upright 26 and extends parallel to the I beam 32 to be supported by an upright in the molding station 16, whereby the two I beams 32 and 34 form the two longitudinally extending upper corners of the loading station 12. The outer top edge of the loading station is formed by a horizontally disposed truss 36 having one end bolted within the flanges of the I beam 32 and the other end bolted within the flange 34.

The oven station 14 like the loading station includes two vertical tubular uprights one of which is shown at 38 supporting the top frame. One upper radially extending edge of the oven station 14 is formed by an I beam 40 welded to the top of the tubular upright 38 at its first end and bolted between the flanges of the I beam 32; the other upper radially extending edge of the oven station 14 is formed of another I beam 42 welded or bolted at its outer end to a tubular upright and bolted at its inner end between the flanges of the I beam 32.

To support the roof of the oven station 14, two horizontally disposed, spaced-apart parallel I beams 44 and 46 extend between and have their ends bolted within the flanges of the I beams 40 and 42, whereby the I beam 44 forms the outer edge of the roof of the oven station 14 and the I beam 46 from a centrally located support for the roof parallel to the I beam 44. A portion 48 of the heater for the oven is also shown in FIG. 1.

The molding station 16 includes two parallel, vertically disposed tubular uprights 50 and 52 supporting the ends of the two I beams 32 and 34 which form the upper radially extending sides of both the loading station 12 and the molding station 16. A horizontally disposed truss 54 has one end bolted between the flanges of the I beam 32 and its other end bolted between the flanges of the I beam 34 to form the outer upper edge of the molding station 16. At the inner end of the top of the molding station 16 is a horizontally disposed I beam 56 having one end bolted within the flanges of the I beam 32 and its other end bolted within the flanges of the I beam 34, whereby it is parallel to the I beam 54 and forms the other edge of the roof of the molding station 16.

The unloading station 18 does not have a separate frame but may include any other suitable housing.

In operation, a sheet of thermoformable plastic is clamped in each of the sheet holding frames 22A–22D while the frame is in a loading station 12. After leaving the loading station 12, the following operations are performed on each sheet: (1) the plastic sheet is heated in the oven station 14; (2) the plastic sheet is shaped by the two dies 58 and 60 (FIG. 3) in the molding station 16 which dies move together with the male die 58 forcing the film into the female die 60 in a manner known in the art; and (3) the plastic sheet is removed from the sheet holding frame in the loading station 18.

A more detailed description of the operation of a molding machine of the rotary type may be found in the United States patent to J. Edward Kostur, Sr., U.S. Pat. 3,384,357 for Plastic Forming Apparatus.

MOLDING STATION

As best shown in FIGS. 1 and 3, the molding station 16 extends downwardly into a pit or recess 62 in the floor 64 beneath the molding machine. The two tubular uprights 50 and 52 forming the radially vertical edges of the molding station 16 extend from the bottom of the recess 62 up to the ends of the two I beams 32 and 34 which they support. At the bottom of the recess 62 are four base support plates, two of which are shown at 66 and 68.

The upright 52 is mounted at its lower end to the base support plate 66 and the upright 50 is similarly mounted to a support plate (not shown) at the bottom of the recess 62. A radially extending horizontal support bar 70 extends from the base support plate 66 to which it is fastened inwardly to the base support plate 68 and a similar base support bar (not shown) extends inwardly from the base of the upright 50 in a direction parallel to the base support bar 70. A third base support bar 72 extends from the base support 68 transversely thereto to the opposite side of the molding station 16.

To move the dies 58 and 60 (FIG. 3) from the top and bottom of the molding station 16 against a plastic sheet held within the sheet holding frame, four vertically disposed racks 74A–74D, an upper platen 76, and a lower platen 78 are provided. The rack 74A is positioned and supported by the vertical upright 50 and the rack 74 is adjacent to and supported by the vertical upright 52. The two racks 74B and 74C are spaced apart on the inner edge of the molding station 16. The upper and lower platens 76 and 78 each include motor driven pinions (not shown) that engage with racks 74A–74D to drive the platens 76 and 78 towards the center of the molding station 16 where the dies 58 and 60 (FIG. 3) form a plastic article from a sheet of plastic held within a sheet holding frame. The platens 76 and 78 are movably supported by other upright guide posts (not shown) as they reciprocate within the molding station.

Further details of the drive mechanism for a molding station can be found in U.S. Pat. No. 3,025,566 to J. Edward Kostur for Automatic Vacuum Forming Machine for Plastics.

This molding station has several advantages.

Firstly, the I beams 32 and 34 extending across both the molding station 16 and the loading station 12 reduce the vibration of the molding station when the dies are brought together because of their high mass and rigidity. The reduction in vibration permits better articles to be molded because of the reduction in motion between the male and female dies.

Secondly, by mounting the molding station in a recess 62, larger dies having vacuum chambers can be accommodated while still permitting sufficient space between the retracted platens 76 and 78 for the sheet holding frames 22A–22D to pass between them with the plastic sheets.

ROTARY CARRIAGE ASSEMBLY

As best shown in FIG. 1, the rotary carriage 10 includes three assemblies, which are: (1) a sheet holding asembly 80 that includes the four sheet holding frames 22A–22D; (2) a drive assembly 82; and (3) a coupling assembly 84 for adjustably supporting the sheet-carrying assembly 80 and for applying the drive force from the drive assembly 82 to the sheet-carrying assembly 80.

The drive assembly 82 includes the drive shaft 20, a drive plate 86, a lower truss bearing 88, and an upper truss bearing 90 as best shown in FIG. 3. The lower truss bearing 88 receives the drive shaft 20 beneath the drive plate 86 and is mounted to a rectangular support plate 92 as shown in FIGS. 2 and 3. The upper truss bearing 90 receives the upper end of the drive shaft 20 and is mounted through a mounting post 94 to a frame structure 96.

The drive force is initially applied to the drive plate 86 through a motor 98 mounted to the base plate 92 best shown in FIG. 2. The drive plate 86 applies a rotary force to the drive shaft 20 to which it is fastened to move the sheet-carrying assembly 80 so that the sheet-carrying frames 22A–22B are rotated from station to station. The motor 98 may be of any type but a particularly suitable type of motor is described in the aforementioned patent to Kostur, Sr., U.S. Pat. No. 3,384,357.

To support the upper end of the drive shaft 20, the support post 94 is securely mounted to two transverse trusses 100 and 101, with the truss 100 extending between and being fastened at its opposite ends to the I beams 32 and 34 and with the truss 101 being spaced between and parallel to the I beams 32 and 34. The truss 101 is bolted to the I beam 56 that forms the inner end of the roof support for the molding station 16 at one end and is fastened to the truss 100 at a central location at its other end.

There are four identical sheet-carrying frames 22A–22D in the sheet-carrying assembly 80 with each of the sheet-carrying frames having a corresponding one of the outer support bars 102A–102C and a corresponding one of the inner support bars 104A–104D, with the outer and inner support bars being disposed parallel to each other and being interconnected by a corresponding pair of side bars 106A–106D and 108A–108D as best shown in FIGS. 1 and 2.

Each of the inner bars 104A–104D is mounted at a first end to the coupling unit of the drive shaft 20 by a corresponding one of the first connecting bars 110A–110D and at a second end by a corresponding one of the second connecting bars 114A–114D, which connecting bars all extend radially outward from the drive shaft 20 to an end of an inner bar 104A–104D. Each of the first connecting bars 110A–110D is connected to its corresponding inner bar 104A–104D by a corresponding one of the support plates 112A–112D and each of the second connecting bars 114A–114D is connected to its corresponding inner bar 104A–104D by a corresponding one of the support plates 116A–116D.

The coupling assembly 84 includes a coupling plate 118 and a coupling truss 120, both of which are fastened to the drive shaft 20 to rotate therewith. The coupling plate 118 provides the primary rotational force and the truss assembly 120 provides the primary vertical support to the sheet-carrying assembly 80.

To provide the driving force to the sheet-carrying assembly 80, the coupling plate 118 is bolted to the inner ends of each of the coupling bars 110A–110D and 114A–114D. The coupling disc 118 is also coupled to the shaft 20 so that as the shaft 20 rotates the plate 118 rotates and carries the sheet-carrying assembly 80 with it. The coupling plate 118 also supports the inner ends of the arms 110A–110D and 114A–114D to support the inner ends of the sheet-carrying frames 22A–22D.

To provide vertical support to the sheet-carrying assembly 80, the truss assembly 120 includes four truss sections, two of which are shown in FIGS. 1 and 3 at 120A and 120C, each aligned with a different one of the four radially extending spaces between each of the two pairs of coupling arms 110A–110D and 114A–114D. A first of these four truss sections 120A includes an upper truss arm 122A, a lower truss arm 124A vertically below and parallel with the upper truss arm 122A and a plurality of cross supports 126A interconnecting the upper truss arm 122A and the lower trus arm 124A. The cross supports 126A pass through the space between the radially extending coupling bars 110A and 114B which support the inner bars 104A and 104B of the sheet-carrying frames 22A and 22B respectively.

The inner ends of the upper truss arm 122A and the lower truss arm 124A are fastened to the drive shaft 20 for rotation therewith by means of the two clamps 128A and 130A respectively. As best shown in FIG. 4, a turnbuckle 132A has an upper section and a lower section, with the upper section being fastened to one end of threaded stud 134A, the other end of the stud 134A being fastened to the outer end of the radially extending truss arm 122A and with the lower section being connected to one end of another threaded stud 136A, the other end of the stud 136A being fastened to the support plate 112A of the radially extending coupling bar 110A to give vertical support to one side of the sheet-carrying frame 22A. A second turnbuckle 138B has an upper section and a lower section with the upper section being fastened to one end of a threaded stud 140B, the other end of the threaded stud 140B being fastened to the end of the upper truss arm 122A and with the lower section being fastened to one end of another threaded stud 142B, the other end of the threaded stud 142B being fastened to the support plate 116B of the coupling arm 114B to hold one side of the sheet-carrying frame 22B.

There are three other truss sections 120B–120D, one other truss section 120C being shown fully in FIGS. 1 and 3. Each of these truss sections is constructed in the same manner with each of the support plates 112A–112D and 116A–116D supported vertically by one of the upper truss arms 122A–122D and with each of the upper truss arms supporting two of the support plates.

To adjust the height of one side of the sheet-carrying frames 22A–22D, the corresponding one of the turnbuckles such as the turnbuckle 132A is turned to raise or lower the support plate to which it is connected. In this manner each side of each of the sheet-carrying frames may be independently adjusted in height to level the frames.

The rotating carriage 10 of this invention has several advantages. One advantage is that the drive assembly does not serve as a support post despite its central location. The unitary I beam structure of this molding machine provides adequate support so that the centrally located drive assembly 82 only serves the function of driving the sheet-carrying assembly 80 and the coupling assembly 84. Since the drive assembly does not form a support post, it may be easily assembled and replaced. Moreover, the initial assembly of the molding machine is simplified because of the ease with which the drive assembly is assembled to it.

A second advantage of the rotating carriage of the invention is that the sheet-carrying frames are easily adjusted for height and for horizontal position. The height may be adjusted by turning both of the turnbuckles connected to the support rods 110 and 114 for the sheet-carrying frames 22. To level a sheet-carrying frame 22,

PLATEN

In FIG. 5 a sectional view of the bottom platen 78 and a portion of the die 60 is shown having a base plate 144 and a die mounting section 146 forming the movable platen 78. The die mounting section 146 includes a plurality of parallel I beams 148 each being mounted to the base plate 144 and each having fastened to its upper surface an elongated box shaped channel 150 with inwardly turned lips defining a slot 152 extending along its upper end. T-bolts 154 fit into the elongated box shaped channels 150 with the head of the bolts 156 being within the channels 150 and held against upward movement by the inwardly turned lips thereof and with the shanks of the bolts extending upwardly through the slots 152. End plates, one of which is shown at 158 abutting the far ends of the I beam 148 form the sides of the movable platen.

The die 60 is mounted to a plywood platform 160 which in turn is fastened to the upper flanges of a plurality of parallel I beams 162 having bottom flanges spaced the same distance apart as the I beams 148. Apertures in the bottom flanges of the I beam 162 are spaced so that an aperture in one of the I beams is aligned with the groove or slot 152 in one of the channels 150 and an aperture in the bottom flange of an adjacent I beam 162 is aligned with the slot 152 in an adjacent channel 150 of the platen mounting section 158.

With this structure, the T-bolts 150 are loosely fastened by means of nuts 164 within the apertures in the bottom flanges of the I beam 162. The die together with its mounting base is then aligned with the grooves in the channels 150 of the die mounting platen 158 and inserted over the top of the channels 150 with the heads 156 within the channels 150. The die and its supporting base are then slid into position on top of the movable platen 78 and the bolts 164 tightened to hold it in place.

To mold articles using the molding machine of this invention, suitable dies 60 together with their mounting base are selected. T-bolts 154 are positioned within apertures in the bottom flanges of the I beams 162 and the mounting base for the dies 60 with the bolt heads 56 extending beneath the flanges and with the nuts 164 threaded onto the bolts from above the flange to hold the bolts in place. The die that is to be mounted to the bottom platen is positioned above the platen with the shank of the bolts 154 being aligned with the grooves in the channels 150. The dies and their base are slid over the platen 78 into position. The nuts 164 are then tightened to hold the dies in place on the bottom movable platen 78.

The upper dies 58 are fastened to upper movable platen 76 in the same manner except that the die and its base is positioned below the platen 76 and slid along the platen with the heads 156 of the bolts 152 being within corresponding channels in the upper movable platen 76. The upper dies are aligned with the bottom dies and the nuts 164 are tightened to hold the dies in proper registry with each other.

This arrangement has the advantage of easily fastening the dies in place to the movable platen. A die may be easily removed by loosening the nuts 164 and sliding the die and its base off the movable platen.

SUMMARY OF THE PREFERRED EMBODIMENT

The preferred embodiment for the frame and mounting structure of a molding machine includes a unitary structure constructed about the two elongated I beams 32 and 34 that extend across the entire molding machine from the outer edges of the top of the molding station 16 to the outer edges of the top of the loading station 12. The I beams are supported by uprights 50 and 52 in the molding station 16 and uprights 24 and 26 in the loading station 12.

A structural steel oven station 14 is positioned between the loading station 12 and the molding station 16 and extends transverse to the I beams 32 and 34. The unloading station 18 is in line with the oven station 14 and on the opposite side of the I beams 32 and 34 so that the stations 16, 18, 12, and 14 are radially positioned with respect to a rotary carriage 10. In the rotary carriage 10 a drive shaft 20 is mounted to other structural members. This drive shaft does not support the structure of the molding machine and may be easily removed and replaced if necessary.

To hold the sheets of plastic in place for forming, rectangular sheet-carrying frames 22A–22D are positioned around the driving shaft 20 for rotary movement through the stations of the molding machine. The coupling assembly includes a coupling plate 118 which is fastened to and driven by the shaft 20 and is fastened to and drives the sheet-carrying frames 22. To level and support the sheet-carrying frames 22, four truss sections 120A–120D are attached to and extend radially from the shaft 20 to be driven thereby. Each of the trusses includes two turnbuckles on its ends extending downwardly to the support arms for the sheet-carrying frames 22 within the sheet-carrying assembly 80. These turnbuckles adjust the height of and level the sheet-carrying frames by adjusting the height from the trusses 120 of the support plates 112A–112D and 116A–116D on either side of the sheet-carrying frames.

To hold the dies firmly in place within the molding station 16, the upper and lower movable platens 76 and 78 include a mounting section 146 having elongated rectangular channels 150 with inwardly turned lips defining elongated grooves 152. The platform of the dies 60 includes parallelly extending I beams 162 having apertures in their bottom flanges, with the apertures in the bottom flanges of adjacent I beams 162 spaced apart a distance equal to the spacing between adjacent slots 152 in the channels 150. T-bolts 154 are loosely fastened in the apertures of the bottom flanges of the I beams of the die platforms with the heads 156 of the bolts extending outwardly and with the nuts 164 being threaded on the shanks of the bolts on the inward side of the flanges. The heads of the bolts are aligned with the channels 150 with their shanks extending through the slots 152 so that the dies and their supporting bases may be slid along the mounting section 158 into place on the movable platens. The nuts 164 are then tightened to hold the dies firmly in place.

The frame and supporting structure of this invention has several advantages such as: (1) the dies may be easily mounted in place and firmly fastened to the movable platen; (2) the frame of the molding machine does not vibrate as greatly as prior art machines so that the vibration does not tend to distort the molded article; (3) the drive shaft is not part of the supporting structure for the molding machine and is therefore easily assembled and removed; and (4) the sheet-carrying frames are easily adjusted in height and leveled by the turnbuckles.

Although an embodiment of the invention has been described with some particularity, many modifications and variations are possible in the embodiment without deviating from the scope of the invention. It is therefore to be understood that, within the scope of the appended claims, the invention may be practiced otherwise than as specifically described.

We claim:

1. A molding machine comprising:
   a plurality of stations;
   one of said stations being a molding station;
   a rotary carriage assembly for plastic to be molded;
   said rotary carriage assembly being positioned between said molding station and one of said other of said plurality of stations;
   machine support means including a first heavy elongated structural element extending from the top of one edge of said molding station to the top of the other edge of said other station;

a second heavy elongated structural element disposed parallel to said first structural element and extending from one edge of the top of said molding station to an outer edge of the top of said other station; and a plurality of uprights supporting said first and second heavy structural elements;

said molding station including at least one movable platen adapted to support a die; and said heavy structural elements being of sufficient rigidity and mass to reduce the vibration caused by said movable platen.

2. A molding machine according to claim 1 in which said heavy structural elements are I beams.

3. A molding machine according to claim 1 in which said rotary carriage includes a centrally disposed drive shaft and a plurality of sheet-carrying frame work adapted to receive sheets of plastic;

said sheet-carrying frames being coupled to said drive shaft to be moved thereby through said stations.

4. A molding machine according to claim 1 in which said molding station includes a bottom floor below the level of the floor of the other stations whereby its height from floor to roof is greater than that of said other stations.

5. A molding machine according to claim 1 in which said movable platen includes a plurality of longitudinally extending channels having inwardly turned lips defining narrow longitudinally extending grooves, whereby T-bolts may be mouted in said channels with said shank extending through said groove and said head held by said inwardly extending lips.

6. A molding machine according to claim 5 further including a plurality of dies having mounting bases with apertures adapted to receive the shanks of said T-bolts to be fastened to said movable platen by nuts.

7. A molding machine according to claim 3 in which said support means further includes a truss and at least one of said connecting means includes a turnbuckle; said sheet-carrying means being horizontally disposed and having first and second side member; and said turnbuckle being connected to one side member of each of said sheet-carrying means.

References Cited
UNITED STATES PATENTS

| | | | |
|---|---|---|---|
| 3,192,800 | 7/1965 | Kostur | 18—19 F X |
| 2,354,029 | 7/1944 | Kingston | 18—20 T |
| 2,569,850 | 10/1951 | Falconer | 18—19 R X |
| 2,770,839 | 11/1956 | Boice | 18—19 R X |
| 3,141,193 | 7/1964 | Slemmons | 18—5 RR |
| 3,548,458 | 12/1970 | Goodman | 18—19 P |

ROBERT L. SPICER, JR., Primary Examiner

U.S. Cl. X.R.

425—348, 388, 404